(12) United States Patent
Mu et al.

(10) Patent No.: US 7,904,521 B2
(45) Date of Patent: Mar. 8, 2011

(54) METHOD FOR TRANSFERRING CHAT MESSAGES BY ESTABLISHING CHAT ROOM DATA TRANSFER CHANNEL

(75) Inventors: Lunjian Mu, Shenzhen (CN); Jue Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 606 days.

(21) Appl. No.: 11/501,163

(22) Filed: Aug. 8, 2006

(65) Prior Publication Data

US 2007/0038758 A1 Feb. 15, 2007

(30) Foreign Application Priority Data

Aug. 10, 2005 (CN) .......................... 2005 1 0089897

(51) Int. Cl.
*G06F 15/16* (2006.01)

(52) U.S. Cl. ......... 709/206; 709/203; 709/217; 709/227; 709/238

(58) Field of Classification Search .......... 709/204–207, 709/227, 203
See application file for complete search history.

(56) References Cited

U.S. PATENT DOCUMENTS

| | | | |
|---|---|---|---|
| 7,529,813 B2* | 5/2009 | Lim et al. .................. | 709/219 |
| 7,561,595 B2* | 7/2009 | Garcia-Martin et al. ..... | 370/465 |
| 7,764,637 B2* | 7/2010 | Lin ............................. | 709/206 |
| 2002/0062345 A1 | 5/2002 | Guedalia et al. | |
| 2003/0005280 A1* | 1/2003 | Bobde et al. ................. | 713/150 |
| 2003/0233417 A1 | 12/2003 | Beyda et al. | |
| 2004/0131042 A1* | 7/2004 | Lillie et al. .................. | 370/351 |
| 2005/0021652 A1 | 1/2005 | McCormack | |
| 2005/0172032 A1* | 8/2005 | Pessi ........................... | 709/227 |
| 2005/0213537 A1* | 9/2005 | Ingimundarson et al. ..... | 370/352 |
| 2005/0213580 A1* | 9/2005 | Mayer et al. ................. | 370/395.2 |
| 2005/0216594 A1 | 9/2005 | O'Brien et al. | |
| 2005/0243746 A1* | 11/2005 | Mutikainen et al. .......... | 370/282 |
| 2006/0149811 A1* | 7/2006 | Bennett et al. ............... | 709/203 |
| 2006/0230154 A1* | 10/2006 | Nguyenphu et al. .......... | 709/227 |
| 2007/0161373 A1* | 7/2007 | Klatt ............................ | 455/434 |
| 2008/0043717 A1* | 2/2008 | Bellora et al. ................ | 370/352 |

FOREIGN PATENT DOCUMENTS

| | | |
|---|---|---|
| CN | 1787493 | 6/2006 |
| EP | 0 944 004 A1 | 9/1999 |
| WO | WO 01/61984 A1 | 8/2001 |
| WO | WO 02/101483 A2 | 12/2002 |

OTHER PUBLICATIONS

International Search Report for PCT/CN2006/001797, dated Jan. 4, 2007.
Written Opinion of the International Searching Authority issued on Jan. 4, 2007 in connection with PCT Application No. PCT/CN2006/001797.
"Instant Messaging using SIMPLE Architecture" Draft Version 1.0.0, Aug. 5, 2005, Open Mobile Alliance (OMA), 27 pages.

* cited by examiner

*Primary Examiner* — Ian N Moore
*Assistant Examiner* — Jenee Williams

(57) ABSTRACT

Provided is a method for transferring messages by establishing a chat room data transfer channel, applicable to an instant message (IM) chat room system based on Session Initiated Protocol (SIP)/Instant Message and Presence Leveraging Extensions (SIMPLE). The method includes the steps of: establishing a first data transfer channel after a negotiation process between the chat room server and an IM server associated with a client, establishing a second data transfer channel after another negotiation process between the IM server and the corresponding client, and transmitting the messages between the client and the chat room server through the first data transfer channel and the second data transfer channel. The method may support a user to join in the chat room and to transmit messages to other users.

3 Claims, 4 Drawing Sheets

US 7,904,521 B2

METHOD FOR TRANSFERRING CHAT MESSAGES BY ESTABLISHING CHAT ROOM DATA TRANSFER CHANNEL

CROSS-REFERENCE TO RELATED APPLICATIONS/INCORPORATION BY REFERENCE

This patent application makes reference to, claims priority to and claims benefit from Chinese Patent Application No. 200510089897.0 filed on Aug. 10, 2005.

FIELD OF THE INVENTION

The present invention relates to mobile communication field, and more particularly, to a method for transferring messages by establishing a chat room data transfer channel in an instant message (IM) chat room system based on Session Initiated Protocol (SIP)/Instant Message and Presence Leveraging Extensions (SIMPLE).

BACKGROUND OF THE INVENTION

IM services over mobile communication networks and the Internet have been put into practice. The current mobile networks that are capable of providing an IM service include 2G, 2.5G, future 3G (3rd Generation), and the IP Multimedia Subsystem (IMS) etc.

There are two kinds of IM systems known in the art. One is Wireless Village (WV) based, which is carried on Hyper Text Transport Protocol (HTTP)/Wireless Access Protocol (WAP)/Short Message Service Protocol (SMS), and supports 2.5G/3G network. The other is SIP/SIMPLE based, which is carried on SIP/SIMPLE, and supports IMS based IP network.

In a chat room of the SIMPLE IM system, there can be a scene demand from a user. Assuming an active SIMPLE IM chat room is presented, if a new user expects to enter the chat room, the SIMPLE IM chat room will be required to provide a data transfer channel for the new user, so that the new user can chat with and transmit messages to other users.

However, the conventional SIP/SIMPLE IM systems may not provide relating solutions or methods to transfer data between the new user and the other users after the new user enters the chat room.

SUMMARY OF THE INVENTION

An embodiment of the present invention provides a method for transferring messages by establishing a chat room data transfer channel, applicable to an instant message (IM) chat room system based on Session Initiated Protocol (SIP)/Instant Message and Presence Leveraging Extensions (SIMPLE) that includes an IM server associated with a client and a chat room server. The method includes the steps of:
establishing a first data transfer channel after a negotiation process between the chat room server and the IM server;
establishing a second data transfer channel after another negotiation process between the IM server of the client and the client; and
transmitting the messages between the client and the chat room server through the first data transfer channel and the second data transfer channel.

Another embodiment of the present invention provides another method for transferring messages by establishing a chat room data transfer channel, applicable to an instant message (IM) chat room system based on Session Initiated Protocol (SIP)/Instant Message and Presence Leveraging Extensions (SIMPLE) and including a chat room server. The method includes the steps of:
establishing a data transfer channel after a negotiation process between a client and a chat room server; and
transmitting messages between the client and the chat room server through the data transfer channel.

DETAILED DESCRIPTION OF THE INVENTION

In a SIP/SIMPLE chat room, all messages from users are transmitted to a chat room server first, and then distributed by the chat room server to other users. Thus, it is necessary to establish a data transfer channel between a new user and the chat room server for transmitting messages.

Figure 1:
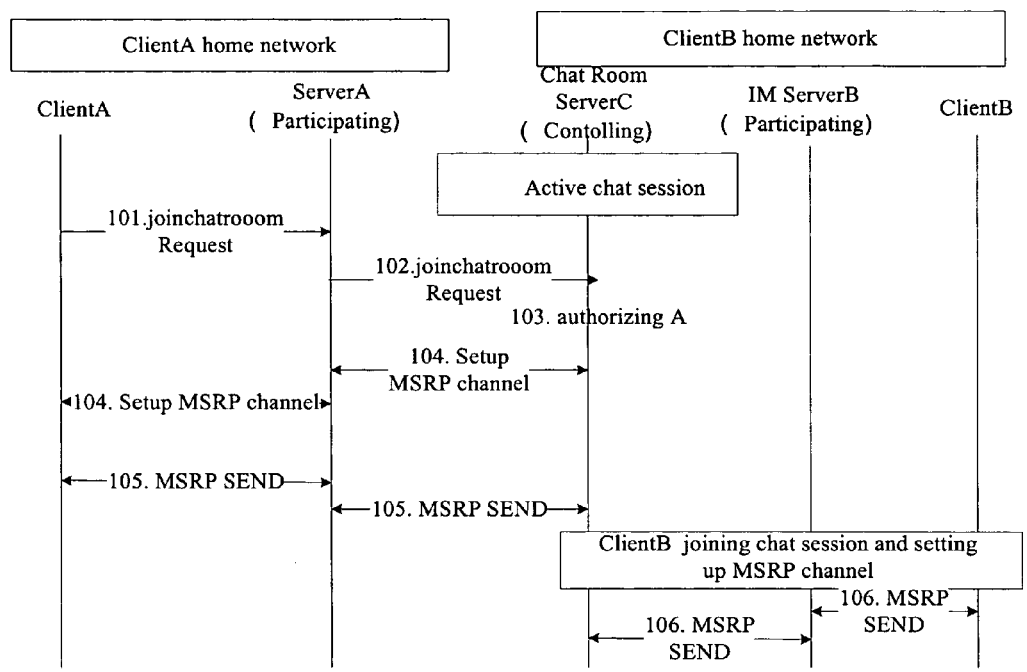
FIG. 1 is a service flow chart showing a process of transferring messages by establishing a data transfer channel after a new user joins in a chat room according to the first embodiment of the present invention.

Refer to FIG. 1, which is a service flow chart showing a process of transferring messages by establishing a data transfer channel after a new user joins in a chat room according to a first embodiment of the present invention. Client A and client B represent clients for two users expecting to enter the SIMPLE IM chat room. The chat room server is a SIMPLE IM server where the chat room system with the function of chat room controlling locates. The IM server A represents a home SIMPLE IM server of the client A and has the function of chat room participating. The IM server B represents a home SIMPLE IM server of the client B and has the function of chat room participating. The client A and the chat room belong to different home networks, while the client B and the chat room belong to the same home network. The chat room server and the IM server B are two logical entities that can be located in the same physical entity or in two different physical entities.

Referring to FIG. 1, the process of transferring messages by establishing a data transfer channel after a new user joins in a chat room according to the first embodiment of the present invention includes the following steps:

101. If a user A expects to enter the chat room, it may send a request message for joining the chat room to the corresponding home IM server A through the client A.

102. The IM server A transfers the request message to the chat room server upon receiving it.

103. The chat room server authenticates the user A, and if it gets authenticated, the chat room server admits the user A to enter the chat room; otherwise, refuse the user A and the latter case will not be discussed here.

104. The IM server A and the chat room server establish an MSRP (Message Session Relay Protocol) transfer channel by SIP/SDP (Session Description Protocol) signaling negotiation, so that the IM server A and the chat room server can transfer data directly to each other based on the negotiated information such as the port number and the media transfer type. Also, the client A and the IM server A establish an MSRP transfer channel by SIP/SDP signaling negotiation, so that they can transfer data directly to each other based on the negotiated information such as the port number and the media transfer type.

105. The client A transfers chat messages to the chat room server in the following manner. First, the client A transmits the chat messages of the user A to the IM server A by using the MSRP SEND signaling. And then, the IM server A transfers the chat messages of the user A to the chat room server using the MSRP SEND signaling. Here, the IM server A serves as an MSRP transfer point.

106. Further, the chat room server distributes the chat messages of the user A to other clients of users in the chat room, wherein the data transfer channel for distributing can multiplex the chat room server and the existing data transfer channels of the other users in the chat room (not shown in the figure).

Similarly, if a user B expects to enter the chat room, it is also necessary to establish independent MSRP channels between the IM server B and the chat room server as well as between the IM server B and the client B. The user B can transfer chat messages to the chat room server in the following manner.

First, the client B transmits the chat messages of the user B to the IM server B by using the MSRP SEND signaling.

And then, the IM server B transfers the chat messages of the user B to the chat room server using the MSRP SEND signaling. Here, the IM server A serves as an MSRP transfer point. Later, the chat room server distributes the chat messages of the user B to other clients of users in the chat room.

Figure 2:
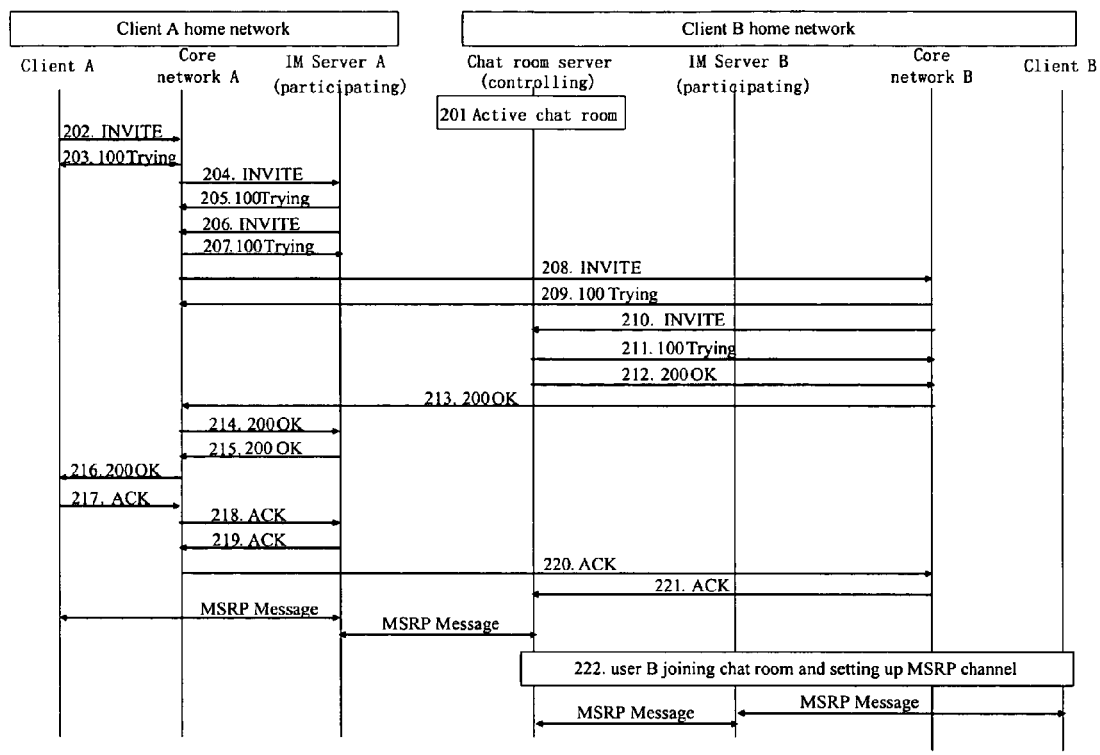
FIG. 2 is a signaling flow chart showing a process of transferring messages by establishing a data transfer channel after a new user joins in a chat room according to the first embodiment of the present invention.

Referring to FIG. 2, a process of transferring messages by establishing a data transfer channel after a new user joins in a chat room according to the first embodiment of the present invention includes the following steps:

201. The chat room server has at least one active chat session.

202. The SIP/SIMPLE IM client A sends a SIP INVITE request message to a home SIP core network A upon receiving the request for joining the chat room from the user A. In the SIP INVITE request message, the Request-URI includes the chat room identification, and the SDP parameter carries the transfer capacity and negotiation parameter information of the client A, such as the IP address, the port number and the supported media transfer type.

In a case that the user A is invited to join the chat room, the chat room server will send a SIP INVITE invitation message to the Client A associated with the user A after receiving a SIP REFER request message sent from other users for inviting the user A. The SIP REFER request message can include the URI information of the invited user A and the URI information of the chat room. The present embodiment will be further described below by taking an example of the case that the user joins the chat room actively.

203. The core network A sends a SIP 100 trying response message to the client A so as to acknowledge the receipt of the request message.

204. The core network A transfers the SIP INVITE invitation message in step 202 to the IM server A.

205. The IM server A sends a SIP 100 trying response message to the core network A so as to acknowledge the receipt of the SIP INVITE invitation message.

206. The IM server A reads the chat room identification carried in the SIP INVITE invitation message and determines that the chat room belongs to the core network B, and then sends a new SIP INVITE message to the core network A. The new SIP INVITE message includes a chat room identification in the Request-URI and carries the transfer capacity and negotiation parameter information of the client A in the SDP parameter, such as the IP address, the port number and the supported media transfer type.

207. The core network A sends a SIP 100 trying response message to the IM server A so as to acknowledge the receipt of the SIP INVITE message of step 206.

208. The core network A transfers the SIP INVITE message of step 206 to the core network B.

209. The core network B sends a SIP 100 trying response message to the core network A so as to acknowledge the receipt of the SIP INVITE message.

210. The core network B transfers the SIP INVITE message of step 206 to the chat room server.

211. The chat room server sends a SIP 100 trying response message to the core network B so as to acknowledge the receipt of the SIP INVITE message.

212. The chat room server authenticates the client A, and if it cannot get authenticated, the service process ends; otherwise, if authenticated, the chat room server admits the user A to enter the chat room and sends a SIP 200 OK response message to the core network B. The SIP 200 OK response message includes an SDP parameter carrying the transfer capacity and negotiation parameter information of the chat room, such as the IP address, the port number and the supported media transfer type.

213. The core network B transfers the SIP 200 OK response message of step 212 to the core network A.

214. The core network A transfers the SIP 200 OK response message of step 212 to the IM server A.

With the above steps 206-214, it accomplishes the negotiation process of establishing the MSRP channel between the home IM server of the user A (i.e. the IM server A) and the chat room server.

215. The IM server A sends a new SIP 200 OK message to the core network A, wherein the SDP parameter carrying the transfer capacity and negotiation parameter information of the IM server A available to the client A, such as the IP address, the port number and the supported media transfer type.

216. The core network A transfers the SIP 200 OK response message of step 215 to the client A.

At this point, the above steps accomplish the negotiation process of establishing the MSRP channel between the client A and the home IM server of the user A (i.e. the IM server A).

217. The client A sends a SIP ACK acknowledge message to the core network A so as to acknowledge the receipt of the SIP 200 OK response message of step 216.

218. The core network A transfers the SIP ACK acknowledge message of step 217 to the IM server A.

219. The IM server A sends a SIP ACK acknowledge message to the core network A so as to acknowledge the receipt of the SIP 200 OK response message of step 214.

220. The core network A transfers the SIP ACK acknowledge message of step 219 to the core network B.

221. The core network B transfers the SIP ACK acknowledge message of step 219 to the chat room server.

At this point, the client A can send chat messages through the following two steps.

First, the user A sends the chat messages to the IM server A by using the MSRP SEND signaling.

And then, the IM server A transfers the chat messages of the user A to the chat room server using the MSRP SEND signaling. Here, the IM server A serves as an MSRP transfer point. Later, the chat room server distributes the chat messages of the user A to other users in the chat room.

Likewise, messages sent from other users to the user A will be first transmitted to the IM server A through the MSRP channel by the chat room server, and then transferred to the client A from the IM server A through the MSRP channel.

222. Similarly, if a user B expects to enter the chat room, it is also necessary to establish independent MSRP channels between the IM server B and the chat room server as well as between the IM server B and the client B. The signaling process is similar to that discussed above, except that the step of transferring messages between the core network B and the core network A can be omitted since the client B and the chat room server belong to the same home network. The rest are similar to steps 202-221.

At this point, the client B can send chat messages through the following two steps.

First, the user B sends the chat messages to the IM server B by using the MSRP SEND signaling.

And then, the IM server B transfers the chat messages of the user B to the chat room server using the MSRP SEND signaling. Here, the IM server A serves as an MSRP transfer point. Later, the chat room server distributes the chat messages of the user B to other users in the chat room.

Also, messages sent from other users to the user B can be first transmitted to the IM server B through the MSRP channel by the chat room server, and then transferred to the client B from the IM server B through the MSRP channel.

Figure 3:
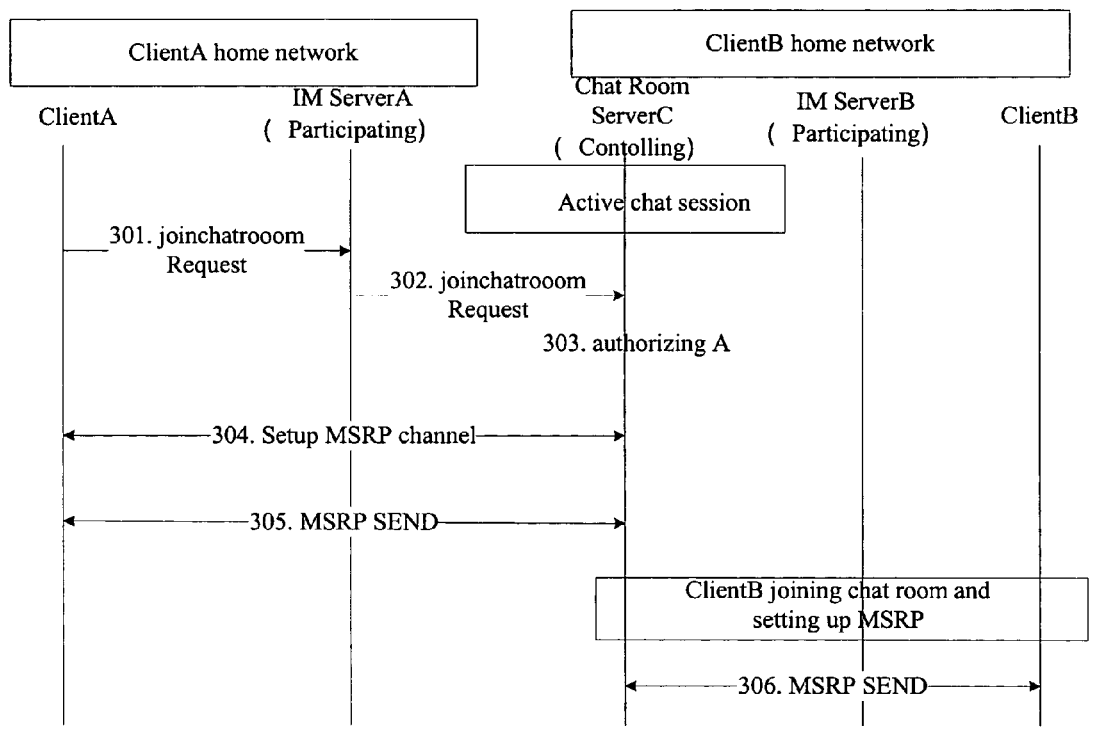
FIG. 3 is a service flow chart showing a process of transferring messages by establishing a data transfer channel after a new user joins in a chat room according to the second embodiment of the present invention.

FIG. 3 is a service flow chart showing a process of transferring messages by establishing a data transfer channel after a new user joins in a chat room according to a second embodiment of the present invention.

Referring to FIG. 3, client A and client B represent clients for two users expecting to enter the SIMPLE IM chat room. The chat room server is a SIMPLE IM server where the chat room system with the function of chat room controlling locates. The IM server A represents a home SIMPLE IM server of the client A and has the function of chat room participating. And, the IM server B represents a home SIMPLE IM server of the client B and has the function of chat room participating. The client A and the chat room belong to different home networks, while the client B and the chat room belong to the same home network. The chat room server and the IM server B are two logical entities that can be located in the same physical entity or in two different physical entities.

As shown in FIG. 3, the service flow of the second embodiment includes the following steps.

301. If a user A expects to enter the chat room, it may send a request message for joining the chat room to the corresponding home IM server A through the client A.

302. The IM server A transfers the request message to the chat room server upon receiving it.

303. The chat room server authenticates the user A, and if it gets authenticated, the chat room server admits the user A to enter the chat room; otherwise, refuse the user A and the latter case will not be discussed here.

304. The client A and the chat room server establish an MSRP transfer channel between by SIP/SDP signaling negotiation, so that the client A and the chat room server can transfer data directly to each other based on the negotiated information such as the port number and the media transfer type.

305. The user A transfers chat messages to the chat room server in such a manner that the user A transmits the chat messages directly to the chat room server by using the MSRP SEND signaling.

306. Further, the chat room server distributes the chat messages of the user A to other users in the chat room, wherein the data transfer channel for distributing can multiplex the chat room server and the existing data transfer channels of the other users in the chat room (not shown in the figure).

Similarly, if a user B expects to enter the chat room, it is also necessary to establish a direct MSRP channel between the client B and the chat room server. The user B transfers chat messages directly to the chat room server by using the MSRP SEND signaling. And then, the chat room server distributes the chat messages of the user B to other users in the chat room.

Figure 4:
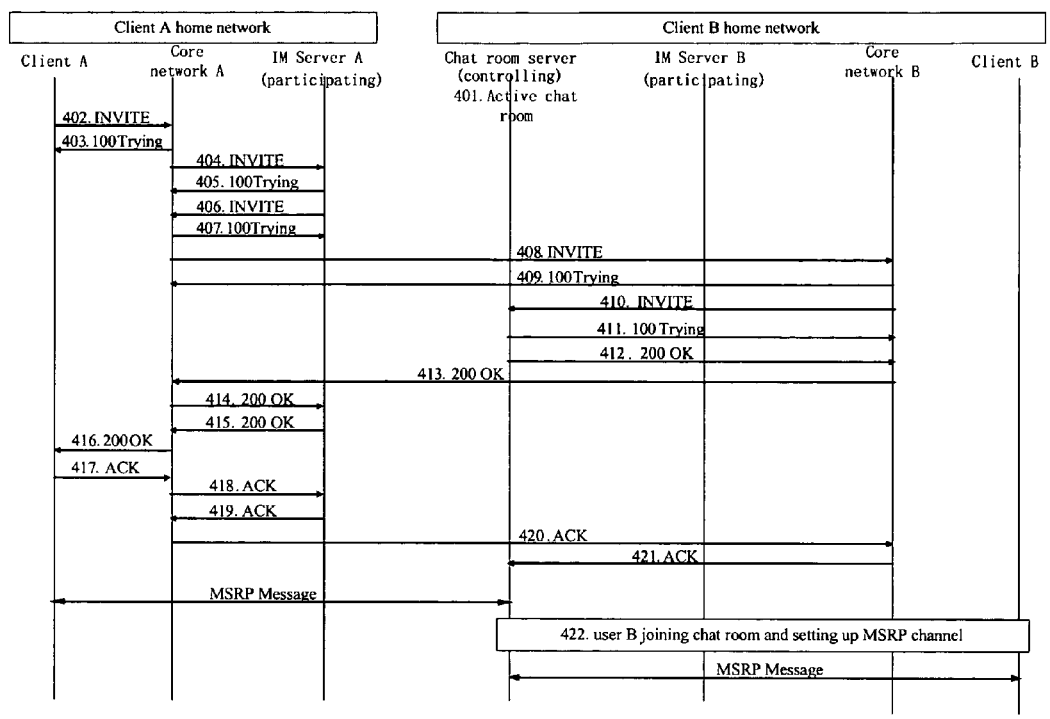
FIG. 4 is a signaling flow chart showing a process of transferring messages by establishing a data transfer channel after a new user joins in a chat room according to the second embodiment of the present invention.

FIG. 4 is a signaling flow chart showing a process of transferring messages by establishing a data transfer channel after a new user joins in a chat room according to the second embodiment of the present invention. Referring to FIG. 4:

401. The chat room server has one active chat session.

402. The SIP/SIMPLE IM client A sends a SIP INVITE request message to a home SIP core network A upon receiving the request for joining the chat room from the user A. In the SIP INVITE request message, the Request-URI includes the chat room identification, and the SDP parameter carries the transfer capacity and negotiation parameter information of the client A, such as the IP address, the port number and the supported media transfer type.

In a case that the user A is invited to join the chat room, the chat room server will send a SIP INVITE invitation message to the Client A associated with the user A after receiving a SIP REFER request message sent from other users for inviting the user A. Wherein, the SIP REFER request message includes the URI information of the invited user A and the URI information of the chat room. The present embodiment will be further described by taking an example of the case that the user joins the chat room actively.

403. The core network A sends a SIP 100 trying response message to the client A so as to acknowledge the receipt of the request message.

404. The core network A transfers the SIP INVITE invitation message in step 402 to the IM server A.

405. The IM server A sends a SIP 100 trying response message to the core network A so as to acknowledge the receipt of the SIP INVITE invitation message.

406. The IM server A reads the chat room identification carried in the SIP INVITE invitation message and determines that the chat room belongs to the core network B, and therefore transfers the SIP INVITE message of step 402 to the core network A.

407. The core network A sends a SIP 100 trying response message to the IM server A so as to acknowledge the receipt of the SIP INVITE message.

408. The core network A transfers the SIP INVITE message of step 402 to the core network B.

409. The core network B sends a SIP 100 trying response message to the core network A so as to acknowledge the receipt of the SIP INVITE message.

410. The core network B transfers the SIP INVITE message of step 402 to the chat room server.

411. The chat room server sends a SIP 100 trying response message to the core network B so as to acknowledge the receipt of the SIP INVITE message.

412. The chat room server authenticates the client A, and if it cannot get authenticated, the service process ends; otherwise, if gets authenticated, the chat room server admits the user A to enter the chat room and sends a SIP 200 OK response message to the core network B. The SIP 200 OK response message includes an SDP parameter carrying the transfer capacity and negotiation parameter information of the chat room server, such as the IP address, the port number and the supported media transfer type.

413. The core network B transfers the SIP 200 OK response message of step 412 to the core network A.

414. The core network A transfers the SIP 200 OK response message of step 412 to the IM server A.

415. The IM server A transfers the SIP 200 OK response message of step 412 to the core network A.

416. The core network A transfers the SIP 200 OK response message of step 412 to the client A.

At this point, the negotiation process of establishing the MSRP channel between the client A and the chat room server is accomplished.

417. The client A sends a SIP ACK acknowledge message to the core network A so as to acknowledge the receipt of the SIP 200 OK response message of step 416.

418. The core network A transfers the SIP ACK acknowledge message of step 417 to the IM server A.

419. The IM server A transfers the SIP ACK acknowledge message of step 417 to the core network A.

420. The core network A transfers the SIP ACK acknowledge message of step 417 to the core network B.

421. The core network B transfers the SIP ACK acknowledge message of step 417 to the chat room server.

At this point, the client A can send chat messages by the following two steps: the user A sends the chat messages directly to the chat room server by using the MSRP SEND signaling; and then the chat room server distributes the chat messages of the user A to other users in the chat room. Likewise, messages sent from other users to the user A can be first transmitted to the IM server A through the MSRP channel by the chat room server.

422. Similarly, if a user B expects to enter the chat room, it is also necessary to establish a direct independent MSRP channel between the IM server B and the chat room server. The signaling process is similar to that discussed above, except that the step of transferring messages between the core network B and the core network A can be omitted since the client B and the chat room server belong to the same home network. The rest steps are similar to steps 402-421.

At this point, the client B can send chat messages by the following two steps: the user B sends the chat messages directly to the chat room server by using the MSRP SEND signaling; and then the chat room server distributes the chat messages of the user B to other users in the chat room.

Also, messages sent from other users to the user B can be transmitted directly to the client B through the MSRP channel by the chat room server The above embodiments describe the process of establishing a direct data transfer channel between the user and the chat room server when the user A requests to join the chat room actively. Still, there is another embodiment that the user A is to join the chat room at invitations from other users or from the server. Likewise, there are two manners.

In the first manner, it may establish a transfer channel between the client A and the home IM server A and another transfer channel between the home IM server A and the chat room server. The home IM server A can transfer the messages between the client A and the chat room server.

In the second manner, it may establish a direct transfer channel between the client A and the chat room server.

It can be seen from the above descriptions that in both the two solutions the new user can obtain an MSRP data transfer channel to send the chat messages to the chat room server, and the chat room server can transfer messages from other users to the new user through the data transfer channel with the user client. Thereby the present invention provides a complete solution for the chat room service.

In summary, in the first solution, the presently described technology establishes two independent MSRP transfer channels, one is from the chat room server to the IM server and the other is from the IM server to the user client and when transferring data between the client and the chat room server, the IM server serves as an MSRP transfer point. In Contrast, in the second solution, the presently described technology establishes a direct MSRP transfer channel between the user client and the chat room server. Therefore, the following comparisons can be given.

From the aspect of service control capacity, the first solution is more powerful, because the home server of the user can store information such as user service configuration information, user private performance parameter, block list/reject list, which can be employed to provide specific functions of user personal control, such as informing a new user whether there is any user in his block list and filtering chat messages.

From the aspect of transfer efficiency, however, the second solution is higher, because it does not require a home server of the user to transfer messages but provides direct connection with the chat room server instead.

It will be apparent to those skilled in the art that various modifications and variations can be made in the present invention without departing from the spirit and the scope of the invention. Thus, it is intended that the present invention covers the modifications and variations of this invention provided they come within the scope of the appended claims and their equivalents.

The invention claimed is:

1. A method for transferring messages by establishing a chat room data transfer channel, applicable to an instant message (IM) chat room system based on Session Initiated Protocol (SIP)/Instant Message and Presence Leveraging Extensions (SIMPLE) that comprises an IM server associated with a client and a chat room server, the method comprising:

sending, by the IM server, a first request message to the chat room server, wherein the first request message comprises: an IP address, a port number and a supported media transfer type of the IM server;

receiving, by the IM server, a first response message from the chat room server, wherein the first response message comprises: an IP address, a port number and a supported media transfer type of the chat room server, after the chat room server receives the first request message and authenticates the client successfully;

establishing, by the IM server, a first Message Session Relay Protocol (MSRP) data transfer channel between the chat room server and the IM server based on information of the first request message and the first response message;

receiving, by the IM server, a second request message initiated by the client for joining the chat room, wherein the second request message comprises: an IP address, a port number and a supported media transfer type of the client;

sending, by the IM server, a second response message to the client, wherein the second response message comprises: an IP address, a port number and a supported media transfer type of the IM server available to the client;

establishing a second MSRP data transfer channel between the IM server and the client based on information of the second request message and the second response message, the first MRSP data transfer channel independent of the second MSRP data transfer channel; and transmitting the messages from the client to the chat room server through the first MSRP data transfer channel between the chat room server and the IM server and the second MSRP data transfer channel between the IM server and the client; and wherein messages between the client and the IM server are transferred by a core network associated with the client; and if a core network associated with the IM server and that associated with the chat room server are different, messages from the IM server to the chat room server are transferred by the core network associated with the client and the core network associated with the chat room server; messages returned from the chat room server to the IM server are transferred by the core network associated with the chat room server and the core network associated with the client; or if the IM server and the chat room server belong to a same core network, messages between the IM server and the chat room server are transferred by the same core network.

2. The method according to claim 1, wherein the first and the second request messages are SIP INVITE request messages, and the IP address, the port number and the supported media transfer type of the IM server and of the client are carried in a Session Description Protocol (SDP) parameter of the SIP INVITE request message;

the first response message is a SIP 200 OK response message, and the IP address, the port number and the supported media transfer type of the chat room server are carried in an SDP parameter of the SIP 200 OK response message;

the second response message is a SIP 200 OK response message, and the IP address, the port number and the supported media transfer type of the IM server are carried in an SDP parameter of the SIP 200 OK response message.

3. The method according to claim 1, further comprising after sending a second response message by the IM server to the client, sending an ACK acknowledge message by the client to the IM server; and sending an ACK acknowledge message by the IM server to the chat room server.

\* \* \* \* \*